United States Patent
Hatamura et al.

(10) Patent No.: US 6,547,620 B1
(45) Date of Patent: Apr. 15, 2003

(54) COMMUNICATION APPARATUS, MEMORY MEDIUM AND METHOD

(75) Inventors: Junji Hatamura, Nagoya (JP); Kenichi Dan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/270,654

(22) Filed: Mar. 16, 1999

(30) Foreign Application Priority Data

Mar. 18, 1998 (JP) .......................................... 10-067519
Mar. 18, 1998 (JP) .......................................... 10-067536

(51) Int. Cl.⁷ .............................................. H04M 3/42
(52) U.S. Cl. ...................................... 445/415; 455/567
(58) Field of Search ................................. 455/569, 566, 455/415, 567; 379/215, 127, 142

(56) References Cited

U.S. PATENT DOCUMENTS

| | | | | |
|---|---|---|---|---|
| 5,265,264 A | * | 11/1993 | Dzung et al. ................. | 455/90 |
| 5,526,406 A | * | 6/1996 | Luneau ......................... | 379/61 |
| 5,749,056 A | * | 5/1998 | Patterson et al. ........... | 455/569 |
| 5,836,009 A | * | 11/1998 | Diamond et al. ............ | 379/93.23 |
| 5,841,853 A | * | 11/1998 | Yamanishi et al. .......... | 379/215 |
| 5,901,212 A | * | 5/1999 | True et al. .................... | 379/215 |
| 6,038,443 A | * | 3/2000 | Luneau ......................... | 455/415 |
| 6,075,850 A | * | 6/2000 | Ali et al. ...................... | 379/142 |
| 6,278,887 B1 | * | 8/2001 | Son et al. ..................... | 455/566 |

* cited by examiner

Primary Examiner—Lester G. Kincaid
Assistant Examiner—Naghmeh Mehrpour
(74) Attorney, Agent, or Firm—Oliff & Berridge, PLC

(57) ABSTRACT

A communication apparatus that is capable of switching to an external caller apparatus if a ringing signal from the external caller apparatus is received during a telephone communication with another external apparatus. The communication apparatus has a handset and a display panel provided in the handset. A caller information display control device causes caller information regarding the external caller apparatus to be displayed on the display panel if a ringing signal is received from the external caller apparatus during a telephone conversation with the other external apparatus. The communication apparatus further includes an input/output level control device that changes the input and output levels of the handset if the caller information is displayed on the display panel during the telephone conversation.

43 Claims, 6 Drawing Sheets

COMMUNICATION APPARATUS, MEMORY MEDIUM AND METHOD

BACKGROUND OF THE INVENTION

1. Field of the Invention

The present invention relates to a communication apparatus that enables a conversation with an arbitrary person via a transmitter-receiver or handset at any moment. The invention relates also to a memory medium storing a program for operating the communication apparatus. Additionally, the invention relates to a type of telephone apparatus incorporating a display panel together with a speaker and a microphone, capable of displaying the telephone number of a second external apparatus on the display panel if a call arrives from the second external apparatus during a telephone communication with a first external apparatus.

2. Description of the Related Art

A representative apparatus of known communication apparatuses may be a cordless telephone, which can be used remote from a base or a main telephone. A cordless telephone has a shape similar to that of an ordinary handset and exchanges aural signals, that are transmitted to and received from a communication partner via a communication line, with the base or the main telephone via predetermined-frequency of electromagnetic waves. Cordless telephones are provided as a child telephone, such as a wireless receiver or handset attached to a charging device, a cordless handset placed at a normal handset position on a base apparatus, and the like.

For a telephone conversation using such a cordless telephone, a user holds the cordless telephone near or on an ear so that voices are outputted and inputted via a speaker and microphone. Development of the communication technology has provided a generally-termed call-waiting service where if there is a call to a subscriber apparatus from a third apparatus during a telephone conversation via the subscriber apparatus, ringing sounds are produced in the subscriber apparatus, superimposed on the voices of the present communication partner. A cordless telephone adapted to the call-waiting service is capable of, if receiving a ringing signal from a second external apparatus during a telephone conversation with a first external apparatus, switching from the first external apparatus to the second external apparatus upon an instruction inputted by a user pressing a call-waiting button.

A caller identification service has started wherein the telephone number of a caller apparatus notified on a receiver side by adding the caller number to a ringing signal from the caller apparatus. Upon receiving the ringing signal, an apparatus adapted to the caller identification service displays the caller telephone number on a display panel provided in a cordless telephone or a base. Therefore, when such a telephone apparatus receives a call, a user of the apparatus can choose whether to answer the call on the basis of the caller telephone number displayed on the display panel.

However, conventional cordless telephones have drawbacks related to the call-waiting service and the caller identification service as described below.

If a conventional cordless telephone receives a ringing signal from a third apparatus while a user is having a conversation via the cordless telephone, the user needs to hold the cordless telephone at a position and in a posture such that the user can see the display panel provided in the cordless telephone to check the caller telephone number. That is, the user must move the cordless telephone away from the ear to look at the display while maintaining the connection status with the present communication partner. Therefore, to look at the display panel and see the caller telephone apparatus, the user must stop the conversation with the present partner, thereby causing an undesirable or awkward situation.

SUMMARY OF THE INVENTION

The present invention provides a communication apparatus that enables the user to check information regarding a caller while continuing to talk to a present communication partner, without requiring the user to perform any switching operation or the like. The invention also provides a memory medium for storing a program for operating the communication apparatus.

In accordance with one aspect of the invention, there is provided a communication apparatus capable of switching from a telephone communication with a first external apparatus to a telephone communication with a second external apparatus when receiving a ringing signal from the second external apparatus during a telephone communication with the first external apparatus. The communication apparatus includes a transmitter-receiver that is normally held to a user's ear for a telephone communication via a communication line. The transmitter-receiver outputs and inputs voices. A display panel is provided at a predetermined location in the transmitter-receiver and is capable of displaying caller information added to a ringing signal from an external apparatus.

The communication apparatus further includes a caller information display control device that displays the caller information regarding the second external apparatus on the display panel if the ringing signal from the second external apparatus is received during a telephone communication with the first external apparatus. The display may be turned on by providing power to the display when the ringing signal from the second external apparatus is received during a communication with the first external apparatus. Alternatively, if an LCD, for example, is used as the display, the LCD may already have power applied but the display may be dark. Thus, turning on of the LCD display may include causing the background to illuminate so that the display is perceivable by a user. The display may likewise, be turned off after a predetermined time has elapsed from the display being turned on or after receiving a cancel command via the keypad.

An input/output level control device is also provided which changes an input level of the transmitter-receiver and an output level of the transmitter-receiver if the caller information regarding the second external apparatus is displayed on the display panel by the caller information display control device during the telephone communication with the first external apparatus.

Therefore, if the telephone apparatus receives a ringing signal from a second external apparatus during a telephone communication with a first external apparatus using the transmitter-receiver, the caller information regarding the second external apparatus is displayed on the display panel provided in the transmitter-receiver and the input/output levels of the transmitter-receiver are changed. In order to see the caller information, a user needs to put the transmitter-receiver in such a position that the user can look at the display panel. In this apparatus, since a generally-termed hands-free talk function is engaged by changing the input/output levels of the transmitter-receiver, the user can temporarily move the transmitter-receiver away from a user's ear to look at the display panel while maintaining a state where the telephone communication with the first external apparatus is possible. Thus, the telephone apparatus allows the user to check the caller information by looking at the display panel while continuing to talk to the present communication partner, without requiring the user to perform any switching operation or the like.

In this invention, the communication line may be a public telephone line, or a dedicated line, in the form of an actual cable or a wireless channel or the like.

The transmitter-receiver may suitably be a cordless telephone, or may also be a different type device that is normally held by a hand for communication with other devices.

The display panel may suitably be a display capable of displaying characters and the like. For example, the display panel may be a liquid crystal display (LCD), a segment display panel employing light-emitting diodes (LEDs) or the like, as long as the display panel is capable of displaying caller information.

The caller information may suitably be a caller telephone number notified by a service provided via a telephone line, a message expressed by characters, or the like.

The above-described communication apparatus may be capable of switching from a telephone communication with a first external apparatus to a telephone communication with a second external apparatus on the basis of a predetermined switching operation signal, after the input level and the output level of the transmitter-receiver are changed by the input/output level control device. Since the communication apparatus is capable of switching from the telephone communication with the first external apparatus to the telephone communication with the second external apparatus it is possible for a user to select whether to continue the telephone communication with the first external apparatus or switch to the telephone communication with the second external apparatus, through a predetermined switching operation, after checking the caller information by looking at the display panel during a generally-termed hands-free talk.

Furthermore, in the communication apparatus of the invention, after the input level and the output level of the transmitter-receiver are changed by the input/output level control device, the input level and the output level may be changed back to a previous input level and a previous output level, respectively, on the basis of a predetermined changing operation signal. Since after the input level and the output level of the transmitter-receiver may be changed by the input/output level control device, the input level and the output level are changed back to a previous input level and a previous output level, respectively, it is possible for a user to resume the previous manner of using the transmitter-receiver. In other works, the use may resume holding the transmitter-receiver to a user's ear, so as to facilitate the hearing of a communication partner's voice through a predetermined changing operation after checking the caller information by looking at the display panel during a generally-termed hands-free talk.

According to another aspect of the invention, there is provided a memory medium storing a program for controlling a communication apparatus as described above. The program may include programs for performing operations corresponding to the operations performed by the caller information display control device and the input/output level control device described above. That is, the operations performed by the above-described communication apparatus of the invention can be realized by a CPU operating on the basis of the programs stored in the memory medium.

According to still another aspect of the invention, there is provided a telephone apparatus including a case containing a microphone for inputting a voice of a user, a speaker for outputting a voice of a communication partner, and a display panel capable of displaying at least characters and symbols. The telephone apparatus further includes a reception device capable of receiving a telephone number of a second external apparatus from an exchange if a call arrives from a second external apparatus when the telephone apparatus is connected to a first external apparatus via a telephone line. A display device is provides that displays the telephone number of the second external apparatus received by the reception device on the display panel. A microphone sensitivity increasing device is also provided that increases an input sensitivity of the microphone after the reception device receives the telephone number of the second external apparatus.

In this telephone apparatus, if a call arrives from a second external apparatus when the telephone apparatus is communicating with a first external apparatus via a telephone line, the reception device receives the telephone number of the second external apparatus from an exchange. The received telephone number is displayed on the display panel by the display device.

The display may be turned on by providing power to the display when a ringing signal from a second external apparatus is received during a communication with a first external apparatus. Alternatively, if an LCD, for example, is used as the display, the LCD may already have power applied but the display may be dark. Thus, turning on of the LCD display may include causing the background to illuminate so that the display is perceivable by a user. The display may likewise, be turned off after a predetermined time has elapsed from the display being turned on or after receiving a cancel command via the keypad.

The display panel is contained together with the speaker and the microphone in the case. In this situation, therefore, a user needs to put the telephone apparatus apart from the user's face in order to look at the display panel to check the telephone number of the second external apparatus, i.e., the caller apparatus. At this moment, the microphone input sensitivity has been increased by the microphone sensitivity increasing device in the invention. Therefore, even though the user moves the telephone apparatus apart from the user's face, i.e., the microphone becomes distantly located from the user's mouth, the apparatus does not cause a problem of excessively low voices transmitted to the partner.

Thus, if a call arrives from an external apparatus during a telephone conversation, the telephone number of the external apparatus is displayed on the display panel. Since the display panel is contained together with the speaker and the microphone in the case, a user needs to move the telephone apparatus apart from the user's face in order to look at the display panel to check the telephone number of the caller apparatus. In the invention, however, the microphone input sensitivity is increased at that moment. Therefore, although the user moves the telephone apparatus apart from the user's face, i.e., the microphone becomes distantly located from the user's mouth, the telephone apparatus makes it possible for the user to continue the conversation with the present communication partner, without causing a problem of excessively low voices being transmitted to the partner.

The telephone apparatus may further include a microphone sensitivity returning device that returns the input sensitivity of the microphone to a normal input sensitivity at a predetermined timing after the input sensitivity of the microphone is increased by the microphone sensitivity increasing device. The predetermined timing at which the microphone input sensitivity is returned to the normal level by the microphone sensitivity returning device may be, for example, a timing when a predetermined length of time elapses, a timing when a predetermined key is pressed, and the like.

Since the increased microphone input sensitivity is returned to the normal input sensitivity at the predetermined timing by the microphone sensitivity returning device, the telephone apparatus avoids transmitting excessively high volume voices or sounds to the communication partner, and always maintains a good speech quality.

The telephone apparatus may further include a detection device that detects a level of a sound inputted to the microphone, and a speaker volume increasing device that increases a volume of the speaker if the detection device detects a decrease in the level of a sound inputted to the microphone while the input sensitivity of the microphone is increased by the microphone sensitivity increasing device. Therefore, if the level of a sound or voice inputted to the microphone decreases while the microphone input sensitivity is increased, the speaker volume is increased. That is, if the user talks to the telephone apparatus after putting it apart from the user's face in order to look at the telephone number of the caller apparatus displayed on the display panel, the level of the voice inputted to the microphone naturally decreases. In response to such an input voice level decrease, the speaker volume increasing device increases the speaker volume. Therefore, the telephone apparatus advantageously allows the user to continue the conversation with the present communication partner in a good condition while holding the telephone apparatus apart from the user's face. Since the speaker volume is increased by the speaker volume increasing device in response to a decrease in the level of a sound or voice inputted to the microphone, a normal speaker volume is maintained if the user continues the telephone conversation without moving the telephone apparatus apart from the user's face. Therefore, the telephone apparatus avoids an undesired event that the speaker volume suddenly increases, and disturbs or upsets the user.

The telephone apparatus may further include a speaker volume returning device that returns the volume of the speaker to a previous volume at a predetermined timing after the volume of the speaker is increased by the speaker volume increasing device. The predetermined timing at which the speaker volume is returned to the previous level by the speaker volume returning device may be, for example, a timing when a predetermined length of time elapses, a timing when a predetermined key is pressed, or a timing described below, or the like. Since the increased speaker volume is returned to the previous volume at the predetermined timing by the speaker volume returning device, the telephone apparatus can maintain a good telephone conversation condition without upsetting the user by an excessively high speaker volume increase.

In the telephone apparatus, the speaker volume returning device may return the volume of the speaker to the previous volume if the detection device detects an increase in the level of a sound inputted to the microphone. If the user moves the telephone apparatus back to the previous position adjacent to the users face from a remote position, the level of a voice or sound inputted to the microphone increases. The input level increase is detected by the detection device so that the speaker volume returning device returns the speaker volume from the increased level to the previous level. That is, the increased speaker volume is returned to the previous level if the level of a voice or sound inputted to the microphone increases.

For example, if the user moves the telephone apparatus from a position apart from the user's face back to the previous position adjacent to the user's face, and then talks, the level of the voice inputted to the microphone increases. In response to such a voice input level increase, the speaker volume is returned from the increased level to the previous level. Since the telephone apparatus returns the speaker volume from the increased level to the previous level when the user puts the telephone apparatus back to the previous position adjacent to the user's face, the telephone apparatus allows the user to continue the telephone conversation with a suitable speaker volume.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Figure 1:
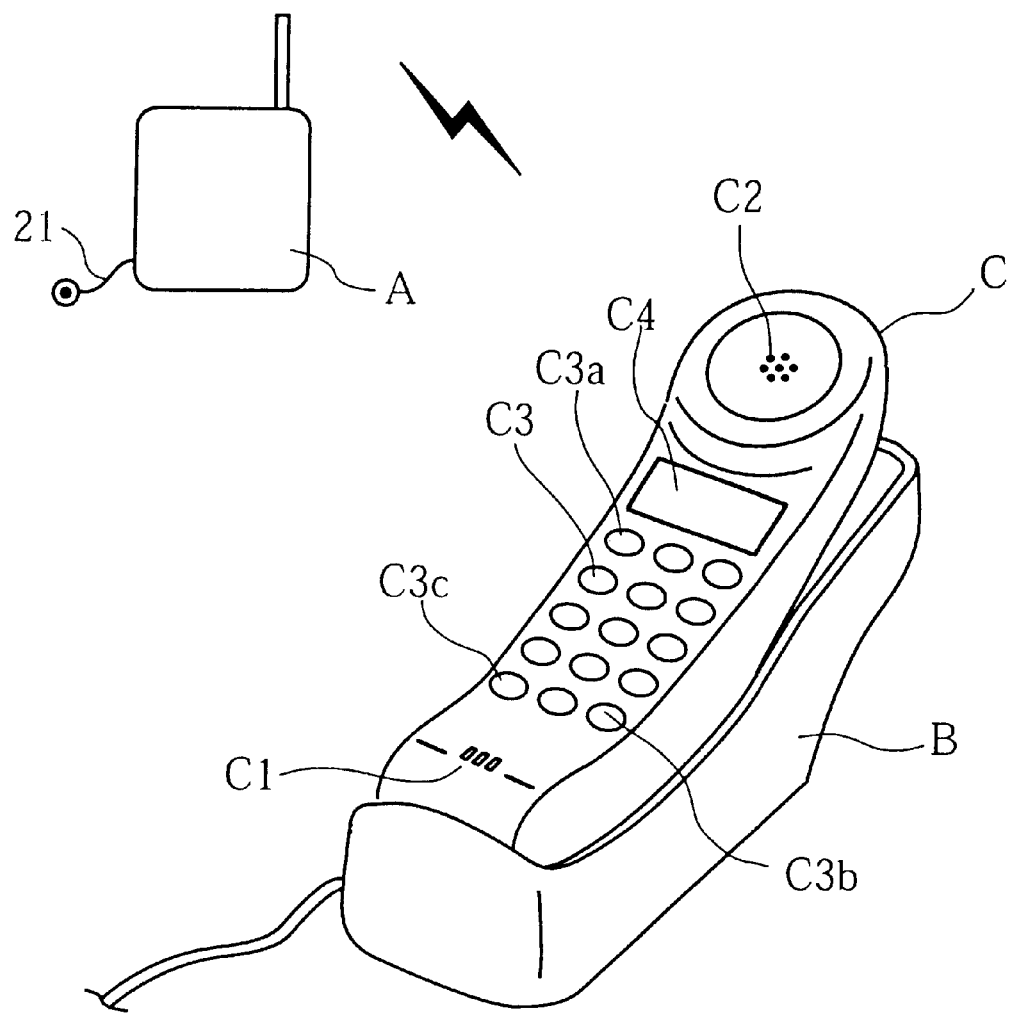
FIG. 1 is a schematic illustration of a telephone apparatus having a cordless child telephone, that is, a handset, according to an embodiment of the communication apparatus of the invention.

FIG. 1 is a schematic illustration of a telephone apparatus having a cordless child telephone according to an embodiment of the communication apparatus of the invention. The telephone apparatus of this embodiment has a main body A that transmits and receives aural signals via a telephone line 21, and a handset (transmitter-receiver) C provided as a child telephone and placed on a charger B that is separate from the main body A. Although the main body A itself is not equipped with numerical keys for inputting a telephone number or a handset for a telephone conversation as shown in FIG. 1, the main body A may also be equipped with such numerical keys or such a handset. For example, the main body A may be a facsimile apparatus capable of transmitting and receiving image information. Similarly, the charger B may be incorporated into the main body A.

The charger B is provided for supplying electric power from a home electric power source or outlet to the handset C. When the handset C is supported on the charger B, the charger B always supplies power to the handset C. When the handset C is removed from the charger B, the power supply from the charger B to the handset C discontinues and, simultaneously, the handset C becomes an off-hook state in which the handset C is ready for a telephone call or conversation.

The handset C has a microphone portion C1 and a speaker portion C2 for facilitating a conversation with a communication partner. Key switches C3, including numerical keys and the like for inputting a receiver telephone number or the like, are provided in a face of the handset C where the microphone portion C1 and the speaker portion C2 are disposed. Also provided in that face is a display panel C4 formed by a liquid crystal display (LCD) and the like for, displaying a telephone number of an external apparatus, i.e., the caller telephone number when receiving a call from an external apparatus. The display panel C4 will be later described in detail. The key switches C3 may include special function key switches, for example, a hook switch C3a for switching to the off-hook state or the on-hook state to start or terminate a call via the handset C, a hands-free switch C3b for switching from a normal talk mode to a hands-free talk mode, a call-wait button C3c for switching between communication partners on the basis of the generally-termed catch-phone or call-waiting service, and the like. The hands-free switch C3b and the call-wait button C3c will later be described in detail. As is readily apparent to those of ordinary skill in the art, the key switches C3 and display panel C4 may be located on different faces of the handset C. For example, the key switches C3 and display panel C4 may be located on a back side of the handset C, the key switches C3 may be located on a front side and the display panel C4 on a back side, or the like.

For the telephone line 21 connected to the telephone apparatus having a system construction as described above, an exchange station provides various services including a service of notifying a caller telephone number during ringing. A telephone adapted to the caller identification service is capable of, upon arrival of a call, displaying the telephone number of the caller. This function is generally termed number display function. That is, upon a call from an external apparatus, the telephone apparatus with the number display function displays the telephone number of the external apparatus on the display panel C4 of the handset C. Therefore, based on the caller number displayed on the display panel C4, a user of the telephone apparatus can decide whether to answer the call.

The exchange also provides a generally-termed call-waiting service of producing ringing sounds in the telephone apparatus together with voices from the present communication partner if there is a call to a telephone apparatus from a third apparatus while the telephone apparatus is engaged in a telephone conversation. It is a precondition for this embodiment that the telephone apparatus receives the call-waiting service. That is, if the telephone apparatus receives a ringing signal from a second external apparatus during a telephone conversation with a first external apparatus via the handset C, the user can switch the communication partner to the second external apparatus by pressing the call-wait button C3c.

Figure 2:
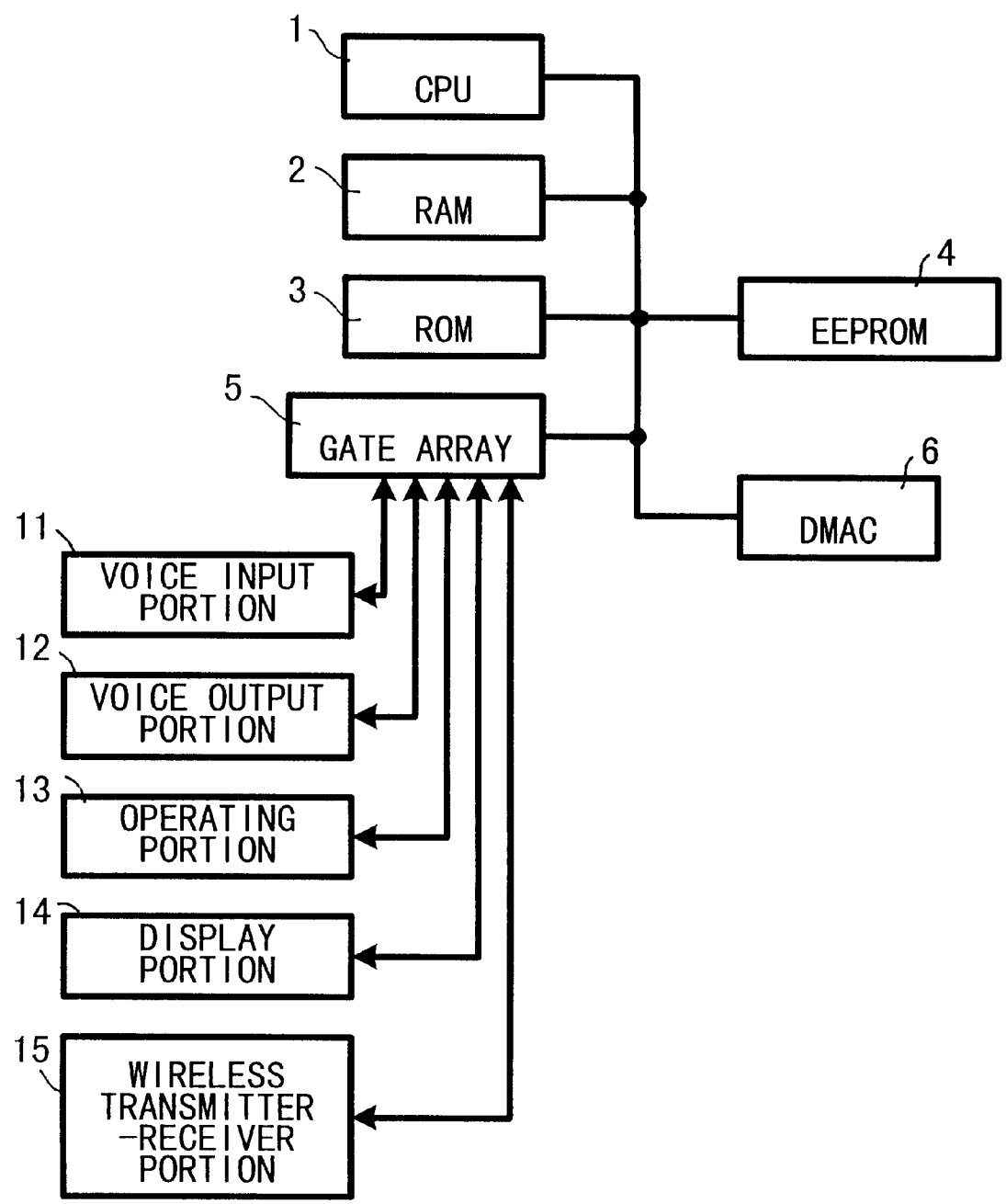
FIG. 2 is an exemplary circuitry block diagram of the handset shown in FIG. 1.

FIG. 2 is a circuit block diagram of the handset C shown in FIG. 1. The handset C includes a CPU 1, a RAM 2, a ROM 3, an EEPROM 4, a gate array 5, a direct memory access controller (DMAC) 6, a voice input portion 11, a voice output portion 12, an operating portion 13, a display portion 14, and a wireless transmitter-receiver portion 15. The CPU 1, the RAM 2, the ROM 3, the EEPROM 4, the gate array 5 and the DMAC 6 may be coupled together by a bus line. The bus line includes an address bus, a data bus, and a control signal line. The gate array 5 may be coupled to the voice input portion 11, the voice output portion 12, the operating portion 13, the display portion 14 and the wireless transmitter-receiver portion 15. A network control unit (NCU) connected to the telephone line 21 for network control and a talking circuit for transmitting and receiving voice signals and the like, via the telephone line 21, may be disposed in the main body A. The NCU and the talking circuit can be controlled wirelessly by the handset C.

The CPU 1 controls the entire handset C. The RAM 2 for storing various data including re-dial data, voice data recorded by an answering function, and the like, is provided with a power backup, such as a rechargeable battery, or the like contained in the handset C. The ROM 3 stores various programs and data including initial settings and the like. The EEPROM 4 stores various flags, registration data, and the like. The gate array 5 functions as an input-output interface of the CPU 1. The DMAC 6 operates to write data into and read data from the RAM 2.

The voice input portion 11, equipped with a microphone, receives voices from a user and outputs them in the form of analog signals to the wireless transmitter-receiver portion 15. The voice output portion 12, equipped with a speaker, outputs audible sounds based on aural signals during a telephone conversation, and the like.

The voice input portion 11 and the voice output portion 12 employ a circuit for changing input and output levels. More specifically, during a normal talk mode suitable for a telephone conversation with the handset C held close to an ear, the voice output portion 12 maintains a normal output volume level, that is, a relatively low volume, and the voice input portion 11 maintains a low microphone sensitivity level due to a short travel distance of voice sound waves. In contrast, if a generally-termed hands-free talk mode is set to allow a user to talk apart from the handset C, the voice output portion 12 changes the speaker output volume to a level higher than the normal level so as to ensure that the output voices reach the remote user and the voice input portion 11 sets a high microphone sensitivity level so as to reliably receive or catch voices from a remote position. During a hands-free conversation. A howling control circuit (not shown) controls or prevents a loop gain so as to effectively prevent an oscillation phenomenon caused by acoustic amplification between the microphone and the speaker.

The operating portion 13 is equipped with key switches including numerical keys for inputting a telephone number, the hook switch C3a, the hands-free switch C3b, the call-wait button C3c, and the like. The operating portion 13 outputs an operation signal corresponding to an operation performed by a user. The display portion 14, equipped with the display panel C4, performs the number display function of displaying a caller telephone number under control by the CPU 1. The wireless transmitter-receiver portion 15 is equipped with an antenna for wirelessly transmitting and receiving various signals, and the like. The wireless transmitter-receiver portion 15 transmits aural signals, control signals, and the like to and receives them from the main body A.

An example operation of the telephone apparatus will be briefly described. The main body A transfers aural signals, a ringing signal or the like received from an external apparatus via the telephone line 21, to the wireless transmitter-receiver portion 15 of the handset C wirelessly. Furthermore, the main body A receives the telephone number of a caller added to a ringing signal therefrom by the service provided by the exchange, and transfers the caller telephone number to the wireless transmitter-receiver portion 15. Further, if a ringing signal arrives from a second external apparatus during a telephone conversation with a first external apparatus using the handset C, ringing sounds are outputted from the voice output portion 12 to a user, superimposed on the voices from the first external apparatus (present communication partner), and the telephone number of the second external apparatus (caller) is displayed on the display panel C4.

The display may be turned on by providing power to the display when a ringing signal from the second external apparatus is received during a communication with the first external apparatus. Alternatively, if an LCD, for example, is used as the display 105, the LCD may already have power applied but the display may be dark. Thus, turning on of the LCD display may include causing the background to illuminate so that the display is perceivable by a user. The display may likewise, be turned off after a predetermined time has elapsed from the display being turned on or after receiving a cancel command via the key switches.

Substantially simultaneously with the display of the caller number on the display panel C4, the mode is switched from the normal talk mode to the hands-free talk mode, so that the user can continue to talk to the present communication partner without holding the handset C to a user's ear or mouth. Therefore, the user can look at the caller telephone number displayed on the display panel C4 while continuing the conversation with the present communication partner. If the user desires to switch from the present partner to the caller by using the call-waiting function, the user presses the call-wait button C3c, so that the connection is switched from the first external apparatus to the second external apparatus.

In other words, the CPU 1 realizes a caller information display control device that, if receiving a ringing signal from a second external apparatus during a telephone communication with a first external apparatus, displays caller information regarding the second external apparatus, by operating in accordance with a program stored in the ROM 3. The CPU 1 also realizes an input/output level control device that changes the input and output levels of the handset when caller information is displayed on the display panel by the caller information display control device during a telephone communication.

The present invention also provides a storage such as ROM 3 for example, that stores programs for controlling a communication apparatus capable of switching from a telephone communication with a first external apparatus to a telephone communication with a second external apparatus if receiving a ringing signal from the second external apparatus during a telephone communication with the first external apparatus. The communication apparatus includes a transmitter-receiver that is normally held to a user's ear for a telephone conversation via a communication line and outputs and inputs voices. The communication apparatus further includes a display panel that is provided at a predetermined site in the transmitter-receiver which is capable of displaying caller information added to a ringing signal from an external apparatus.

The programs stored in the memory medium include a caller information display control program for displaying caller information regarding a second external apparatus on the display panel if a ringing signal arrives from the second external apparatus during a telephone communication with a first external apparatus. The storage medium furthers includes an input/output level control program for changing the input and output levels of the handset when the caller information regarding the second external apparatus is displayed on the display panel by the caller information display control program during the telephone conversation with the first external apparatus.

Figure 3:
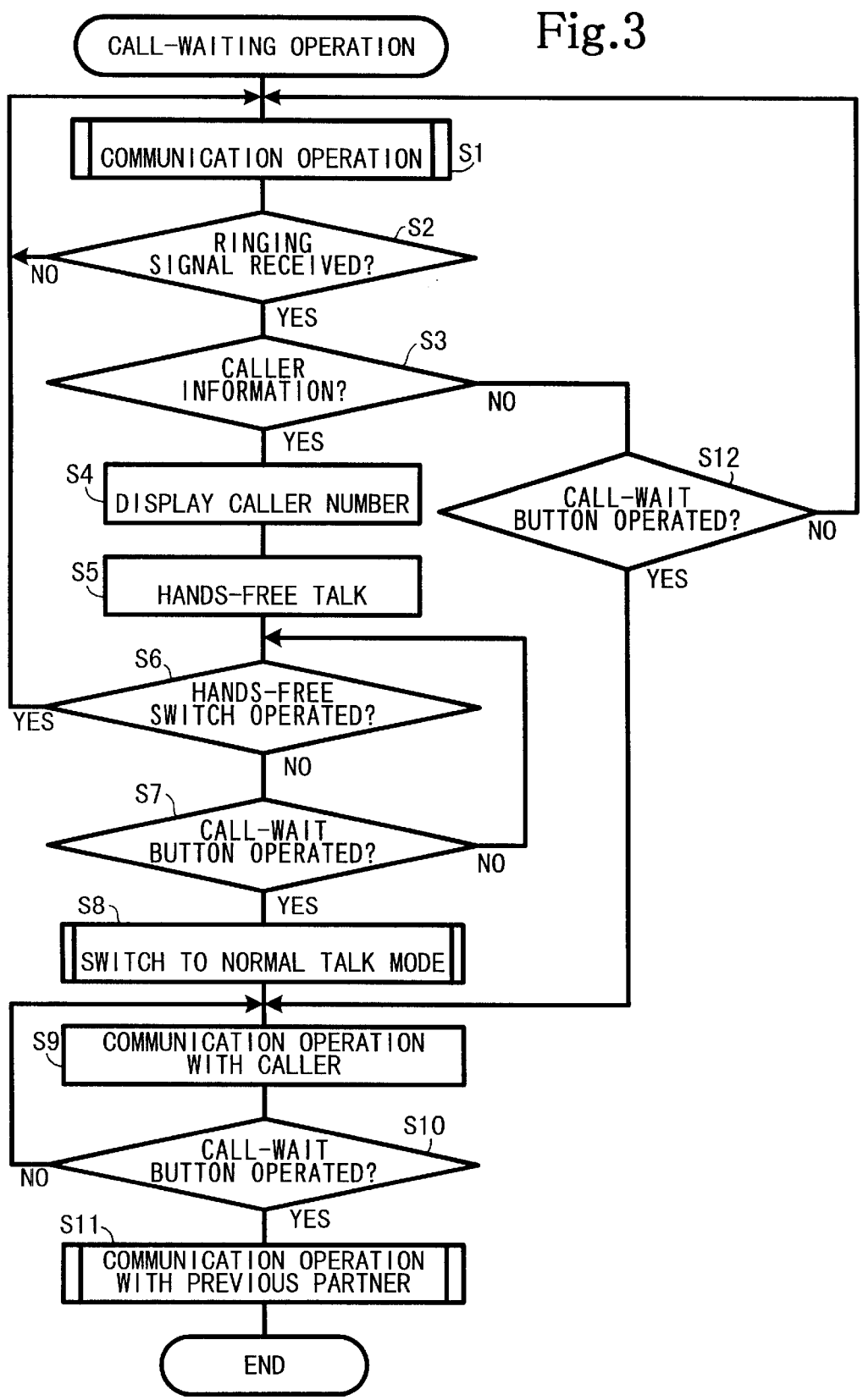
FIG. 3 is an exemplary flowchart outlining a call-waiting operation performed by the handset of FIG. 1.

Major operations of the above-described handset C will be describe with reference to the flowchart in FIG. 3.

The flowchart in FIG. 3 outlines an exemplary procedure of a call-waiting operation performed by the handset C. It is assumed that the CPU 1 is operating for a telephone communication with an external apparatus (present communication partner) in step S1. It is also assumed that during this communication or conversation operation, normal input and output levels of the voice input portion 11 and the voice output portion 12 are maintained, and the normal talk mode is maintained.

In step S2, the CPU 1 determines whether a ringing signal has been received from a second external apparatus via the wireless transmitter-receiver portion 15 during the telephone conversation with the present communication partner (first external apparatus). If a ringing signal has been received (YES in step S2), the CPU 1 determines in step S3 whether the received ringing signal is accompanied by caller information regarding the telephone number of the second external apparatus.

If the caller information is added to the ringing signal (YES in step S3), the CPU 1 displays the received caller telephone number on the display panel C4 in step S4.

Substantially simultaneously with the display of the caller telephone number, the CPU 1 switches from the normal talk mode to the hands-free talk mode in connection with the voice input portion 11 and the voice output portion 12 in step S5. That is, the handset C is held to a user's ear for the telephone conversation with the present communication partner (first external apparatus). If during the telephone conversation, a ringing signal is received from a second external apparatus (caller) and the caller telephone number is displayed on the display panel C4, the mode is switched to the hands-free talk mode, that is, the input and output levels are simultaneously increased so as to allow the user to talk with his/her mouth distant from the handset C. Therefore, the user can look at the caller telephone number displayed on the display panel C4 while continuing to talk to the present communication partner. At the time of switching to the hands-free talk mode, the input and output levels of the speaker and the microphone are not sharply increased to predetermined levels by one step, but are gradually increased thereto.

After switching to the hands-free talk mode, the CPU 1 determines in step S6 whether the user has pressed the hands-free switch C3b. If the determination in step S6 is negative, the CPU 1 determines in step S7 whether the user has pressed the call-wait button C3c. If the user does not press the hands-free switch C3b (NO in step S6) but presses the call-wait button C3c (YES in step S7), the CPU 1 switches from the hands-free talk mode to the normal talk mode in step S8.

Substantially simultaneously with the operation in step S8, the CPU 1 switches the partner in the conversation operation from the present partner (first external apparatus) to the caller (second external apparatus) in step S9. That is, the user can switch to the caller by operating the call-wait button C3c after checking the caller telephone number.

In step S10, the CPU 1 determines whether the call-wait button C3c has been pressed again. That is, if the user presses the call-wait button C3c again (YES in step S10) after the conversation operation with the caller (second external apparatus) ends due to termination of the line connection or the like, the CPU 1 performs, in step S11, the conversation operation for the previous communication partner (first external apparatus). Subsequently, the CPU 1 ends this routine after performing the termination of the line connection or the like.

If it is determined in step S10 that the call-wait button C3c has not been pressed (NO in step S10), the CPU 1 returns to step S9, thereby continuing the operation for the conversation with the caller (second external apparatus).

If it is determined in step S7 that the call-wait button C3c has not been pressed (NO in step S7), the CPU 1 returns to step S6, thereby repeating the determination as to whether the hands-free switch C3b has been pressed.

If it is determined in step S6 that the hands-free switch C3b has been pressed (YES in step S6), the CPU 1 returns to step S1, thereby performing the operation for the communication with the first external apparatus in the normal talk mode.

If it is determined in step S3 that the ringing signal is not accompanied by caller information (NO in step S3), the CPU 1 jumps to step S12, in which the CPU 1 determines whether the user has pressed the call-wait button C3c. If the user presses the call-wait button C3c (YES in step S12), the CPU 1 performs the series of operations in step S9 and the following steps. That is, if a caller telephone number is not added to the ringing signal, only the ringing signal is outputted from the voice output portion 12, but a caller telephone number is not displayed on the display panel C4. In this case, the mode is not switched to the hands-free talk mode but remains in the normal talk mode, and the user is allowed to switch from the present partner to the caller in the normal talk mode by operating the call-wait button C3c.

If it is determined in step S12 that the call-wait button C3c has not been pressed (NO in step s12), the CPU 1 returns to step S1, thereby performing the operation for the communication with the first external apparatus in the normal talk mode.

If it is determined in step S2 that a ringing signal has not been received (NO in step S2), the CPU 1 returns to step S1, thereby performing the operation for the communication with the first external apparatus in the normal talk mode.

Therefore, if the telephone apparatus equipped with the handset C constructed to perform operations as described above receives a ringing signal from a second external apparatus during a telephone conversation with a first external apparatus via the handset C, the telephone number of the second external apparatus (caller) is displayed on the display panel C4 of the handset C and the input/output levels of the handset C are simultaneously increased. In order to see the caller telephone number, a user needs to move the handset C to such a position that the user can look at the display panel C4. In this apparatus, since the hands-free talk function is engaged by simultaneously increasing the input/output levels of the handset C, the user can move the handset C away from a user's ear to look at the display panel C4 while maintaining a state where the user can talk to the present communication partner. Thus, the telephone apparatus allows the user to check the received caller telephone number via the display panel C4 while continuing to talk to the present communication partner, without requiring the user to perform any switching operation or the like.

Although in this embodiment, the aforementioned functions are performed by the handset C provided as a child telephone, those functions may instead be performed by the main body A. In such a case, the main body A wirelessly controls various operations of the handset C related to the functions.

Furthermore, although the handset C is equipped with the speaker for outputting voices of a communication partner, it is also possible to separately provide a large-volume speaker in an on outer or reverse face portion of the handgrip portion of the handset C, so that during the hands-free talk mode, the large-volume speaker outputs voices.

Figure 4:
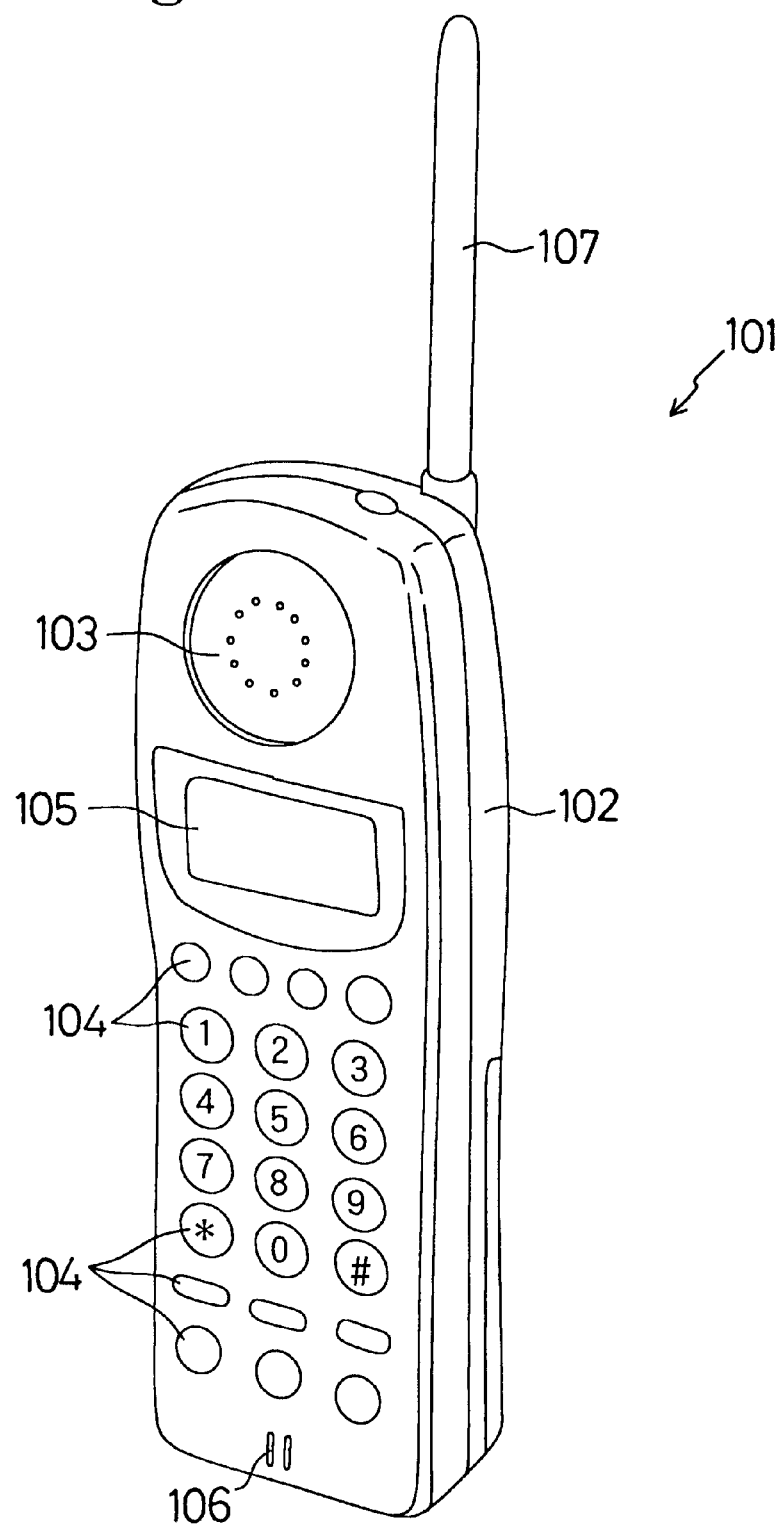
FIG. 4 is a perspective view of a telephone apparatus according to another embodiment of the invention.

FIG. 4 is an external perspective view of a telephone apparatus 101 according to another embodiment of the invention. A main body 102 of the telephone apparatus 101 has, in its front upper portion, a speaker 103 for outputting voices from a communication partner. Provided below the speaker 103 is a display 105, such as a liquid crystal display (LCD), for example capable of displaying a plurality of characters, symbols and the like. The display 105 displays various operating statuses of the telephone apparatus 101, time, and other pieces of information. For example, if during a telephone communication with a first external apparatus a call arrives from a second external apparatus (that is, if a call-waiting function is engaged), the display 105 displays the telephone number of the second external apparatus (caller telephone number) received from an exchange 129.

Provided below the display 105 are a plurality of operating buttons 104, which may include a cancel key, keys for inputting a telephone number, answering a call (connecting to the telephone line), terminating a call (disconnecting from the telephone line), and performing various other operations. Provided below the operating buttons 104 is a microphone 106 for inputting voices of a user. Thus, the telephone apparatus 101 incorporates the speaker 103, the microphone 106, the display 105 and the operating buttons 104 into the single main body 102. The telephone apparatus 101 is wirelessly connected to a telephone line 131 via an antenna 107 disposed in an upper portion of the main body 102.

Figure 5:
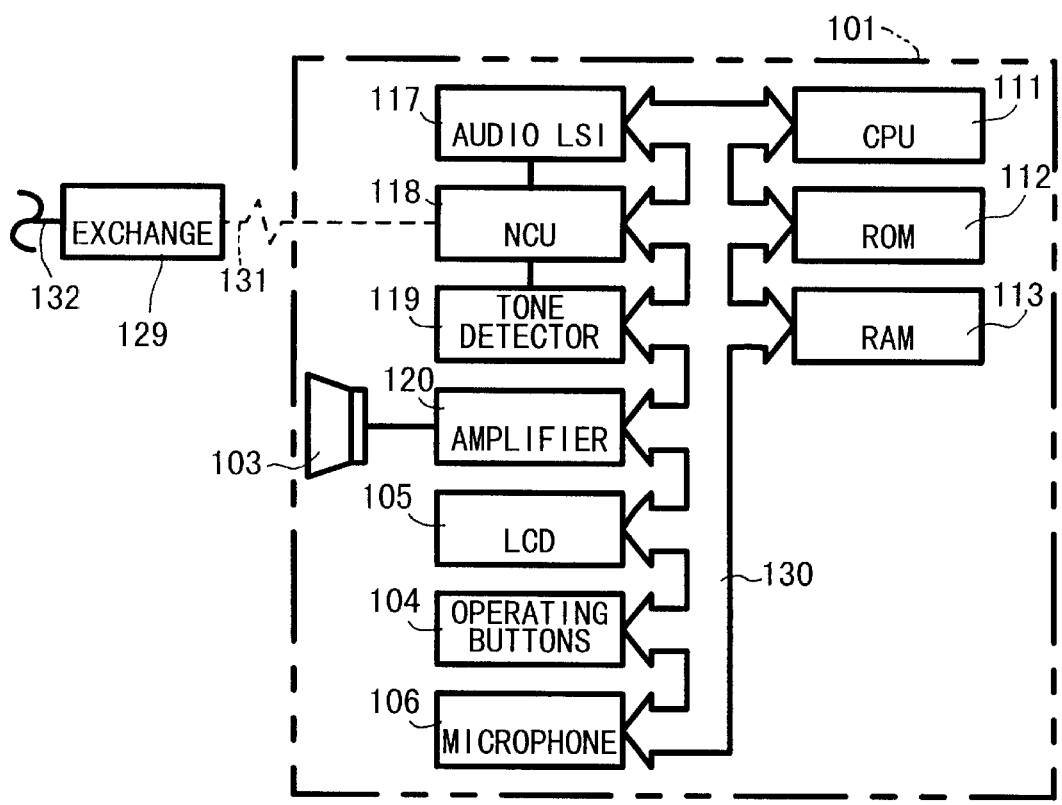
FIG. 5 is an exemplary block diagram illustrating an electrical arrangement of the telephone apparatus shown in FIG. 4.

FIG. 5 is a block diagram illustrating an electrical arrangement of the telephone apparatus 101. The telephone apparatus 101 may include a CPU 111, a ROM 112, a RAM 113, an audio LSI 117, a network control unit (NCU) 118, a tone detector 119, an amplifier 120, the display 105, the operating buttons 104, and the microphone 106. These components may be coupled by a bus line 130.

The NCU 118 for controlling the telephone line and network is wirelessly connected to the telephone line 131 via the antenna 107. The NCU 118 receives from the exchange 129 a ringing signal, the telephone number of a caller apparatus (caller telephone number), and the like, and transmits to the exchange 129 a dial signal in accordance with an operation of operating buttons 104 at the time of calling. Furthermore, the NCU 118 transmits and receives analog aural signals during a telephone conversation.

The CPU 111 controls various components and portions connected via the bus line 130 and performs a telephone conversation operation, a data communication operation, and the like, in accordance with various signals received and transmitted via the NCU 118. The ROM 112 is a non-rewritable memory storing various control programs performed by the telephone apparatus 101, fixed-value data, and the like.

Figure 6:
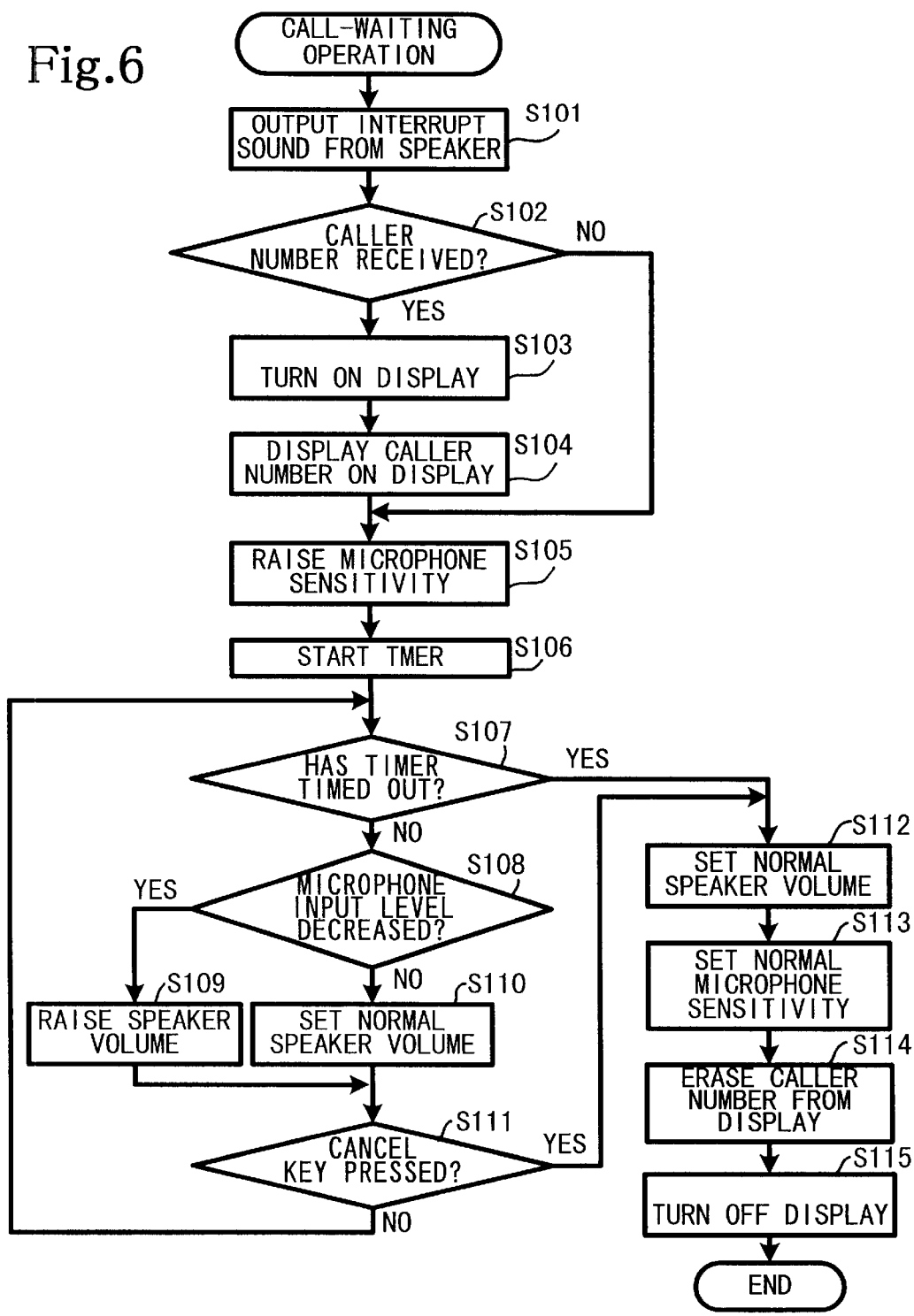
FIG. 6 is an exemplary flowchart outlining a call-waiting operation of the telephone apparatus of FIG. 4.

A program, illustrated by the flowchart in FIG. 6, may be stored in a storage device such as the ROM 112, for example. The RAM 113 is a memory for temporarily storing various data at the time of various operations performed by the telephone apparatus 101. For example, the RAM 113 may store set values of the volume of the speaker 103, the input sensitivity of the microphone 106, and the like.

The audio LSI 117 converts analog aural signals received via the NCU 118 into digital aural signals, and converts digital aural signals generated inside the telephone apparatus 101 into analog aural signals, and outputs the signals to the NCU 118. The tone detector 119 detects the telephone number of a caller apparatus received from the exchange 129. The amplifier 120 sounds the speaker 103 connected thereto to output ringing sounds, voices, and the like.

The telephone apparatus 101 constructed as described above is wirelessly connected to the telephone line 131 via the NCU 118. The telephone line 131 is connected to the exchange 129. The exchange 129 is connected to another exchange via another telephone line 132. The second exchange is connected to an external apparatus via a telephone line.

A call-waiting operation of the telephone apparatus 101 will be described with reference to the flowchart in FIG. 6. The call-waiting operation is performed if a call arrives during a telephone communication.

If there is a call from an external apparatus during a telephone communication with another external apparatus, the exchange 129 transmits to the telephone apparatus 101 a signal indicating the call. Upon receiving the signal, the telephone apparatus 101 performs the call-waiting operation. In step S101 of the call-waiting operation, interrupting tones, for example, are output from the speaker 103 to notify a user that there is another call arriving.

In step S102, the CPU 111 determines whether the telephone apparatus 101 has received a caller telephone number. If the telephone apparatus 101 (receiver apparatus) is a subscriber to both the call-waiting service and the caller identification service described above in conjunction with the related arts, and if the caller apparatus does not reject notification of its telephone number, the exchange 129 transmits the telephone number of the caller apparatus (caller telephone number) to the telephone apparatus 101. Therefore, when the telephone apparatus 101 receives the caller telephone number (YES in step S102), the CPU 111, in step S103, turns on the display 105 and displays the caller telephone number on the display 105 in step S104 to inform the user of the telephone number of the caller apparatus. The turning on of the display 105 may involve providing power to the display. Alternatively, if an LCD, for example, is used as the display 105, the LCD may already have power applied but the display may be dark. Thus, turning on of the LCD display may include causing the background to illuminate so that the display is perceivable by a user.

Conversely, if the receiver telephone apparatus 101 is not a subscriber to the call-waiting and caller ID services, or if the caller apparatus rejects notification of its telephone number, the exchange 129 does not transmit the caller telephone number to the telephone apparatus 101 (NO in step S102). In this case, the CPU 111 skips steps S103 and S104, and goes to step S105.

Normally, the user moves the telephone apparatus 101 apart from the user's face to look at the caller telephone number displayed on the display 105 (check the caller) when the user is informed of arrival of a call by the operation in step S101 during a telephone conversation. As the microphone 106 becomes far apart from the user's mouth, the level of user's voices transmitted to the present communication partner decreases, so that the partner finds it hard to hear the user. Therefore, in step S105, the CPU 111 increases the input sensitivity of the microphone 106 to ensure that the present communication partner can hear.

The user normally finishes checking the caller telephone number in about 2 to 3 seconds. Therefore, in step S106, the CPU 111 starts a timer to detect elapse of a predetermined time, for example, 3 seconds, in order to discontinue the increased input sensitivity of the microphone 106 at a predetermined time.

After starting the timer in step S106, the CPU 111 determines in step S107 whether the timer has timed out. If the timer has not timed out (NO in step S107), the CPU 111 determines in step S108 whether the input level of the microphone 106 has decreased. If the input level of the microphone 106 has decreased (YES in step S108), it is considered that the distance between the user's mouth and the microphone 106 has increased, that is, the telephone apparatus 101 has been put apart from the user's face. Then, the CPU 111 increases the volume of the speaker 103 in step S109 so as to ensure that the user can easily hear voices from the communication partner via the speaker 103.

Conversely, if it is determined in step S108 that the input level of the microphone 106 has not decreased, that is, has remained at a normal level (NO in step S108), it is considered that the telephone apparatus 101 has not been put apart from the user's face. Then, the CPU 111 maintains the normal volume level of the speaker 103 in step S110. If the volume of the speaker 103 were set to a high level in such a situation, a loud sound would be produced adjacent to a user's ear, thereby surprising or disturbing the user.

Thus, when the user moves the telephone apparatus 101 away from the user's face, that is, when the microphone 106 becomes far from the user's mouth, the input level of the microphone 106 is decreased (YES in step S108), so that the volume of the speaker 103 is increased in step S109. After that, if the telephone apparatus 101 is put back to the user's face before the timer times out (NO in step S107), the level of input of users voices into the microphone 106 returns to a normal level (NO in step S108). At the time of the input level returning to the normal level, the CPU 111 returns the volume of the speaker 103 to the normal level in step S109. Thus, if the telephone apparatus 101 is put back to the previous position adjacent to the user's face after it has been moved apart therefrom, the volume of the speaker 103 is returned to the normal level, thereby avoiding an undesired event that an excessively loud sound is produced which may upset the user.

After the volume adjustment of the speaker 103 in steps S108–S110, the CPU 111 checks, in step S111, whether the cancel key of the operating buttons 104 has been pressed. If the cancel key has not been pressed (NO in step S111), the operation returns to step S107, in which it is determined whether the timer has timed out. Therefore, the operations in steps S107 through S111 are repeated until the timer times out.

If it is determined in step S107 that the timer has timed out (YES in step S107), or if it is determined in step S111 that the cancel key of the operating buttons 104 has been pressed (YES in step S111), the CPU 111 returns the volume of the speaker 103 to the normal level in step S112, and returns the input sensitivity of the microphone 106 to the normal level in step S113. Subsequently in step S114, the CPU 111 erases the caller telephone number from the display 105 and turns off the display 105 in step S115. The turning off of the display 105 may include stopping the supply of power to the display 105, causing the background of the display 105 to return to a darkened state, or the like. Then, the call-waiting operation ends.

The input sensitivity of the microphone 106 increased in step S105 is normally maintained until the timer times out (YES in step S107). However, the input sensitivity of the microphone 106 can be returned to the previous level (normal level) by pressing the cancel key (YES in step S111), even before the timer times out. The operation of erasing the caller telephone number in step S114 does not need to be performed at the end of the call-waiting operation. For example, the operation of step S114 may instead be performed when the call ends, or when another call arrives.

As understood from the foregoing description, upon receiving a call during a telephone conversation, the telephone apparatus 101 of this embodiment displays the telephone number of the caller apparatus (caller telephone number) on the display 105, and increases the input sensitivity of the microphone 106. Therefore, while the user is moving or holding the telephone apparatus 101 apart from the user's face, with the microphone 106 being far from the user's mouth, in order to look at the caller telephone number displayed on the display 105, the telephone apparatus 101 avoids a significant reduction in the level of voices transmitted to the present communication partner. Thus, the telephone apparatus 101 avoids making it hard for the partner to hear user's voices and enables the user to easily continue the conversation.

Additionally, The volume of the speaker 103 is increased in accordance with the input level of the microphone 106. The telephone apparatus 101 is able to set the volume of the speaker 103 to a level suitable to a present talk situation or distance, and prevents a sudden increase in the volume of the speaker 103 adjacent to a user's ear.

Various operations described above correspond to and are performed by various devices in the telephone apparatus of the invention. The operation in step S104 corresponds to a display device in the invention. The operation in step S105 corresponds to a microphone sensitivity increasing device. The operation in step S113 corresponds to a microphone sensitivity returning device. The operation in step S108 corresponds to a detection device. The operation in step S109 corresponds to a speaker volume increasing device. The operations in steps S110 and S112 correspond to a speaker volume returning device. Furthermore, the operation in step S110 also corresponds to a speaker volume returning device in a specific form of the invention.

It is to be understood that the invention is not restricted to the particular forms shown in the foregoing embodiments. Various modifications and alternations can be made thereto without departing from the scope of the invention.

For example, the invention is not limited to a cordless phone or a mobile phone connected wirelessly to a telephone line. That is, the invention is applicable to any telephone apparatus or communication apparatus regardless of whether it is connected to a telephone line via a cable or a radio channel.

What is claimed is:

1. A communication apparatus, comprising:
   a transmitter-receiver; and
   an input/output level control device that gradually changes at least one of an input level of the transmitter-receiver and an output level of the transmitter-receiver to assist in detecting a caller identity of a second external apparatus, if an interrupt signal is received from the second external apparatus during a communication with a first external apparatus.

2. The communication apparatus of claim 1, further comprising:
   a display; and
   a display control device that causes caller information corresponding to the second external apparatus to be displayed on the display if the interrupt signal from the second external apparatus is received during the communication with the first external apparatus.

3. The communication apparatus according to claim 1, wherein the communication apparatus is capable of switching from the communication with the first external apparatus to a communication with the second external apparatus on the basis of a predetermined switching operation signal.

4. The communication apparatus according to claim 3, wherein the switching from the communication with the first external apparatus to the communication with the second external apparatus is performed after at least one of the input level and the output level of the transmitter-receiver is changed by the input/output level control device.

5. The communication apparatus according to claim 1, wherein after at least one of the input level and the output level of the transmitter-receiver is changed by the input/output level control device, the at least one of the input level and the output level is changed back to a previous input level or a previous output level, respectively, on the basis of a predetermined changing operation signal.

6. The communication apparatus according to claim 2, wherein the display includes one of a liquid crystal display and a segment display panel.

7. The communication apparatus according to claim 2, wherein the caller information includes at least one of a telephone number for the first external apparatus and a message expressed by characters.

8. The communication apparatus according to claim 1, the transmitter-receiver further comprising:
   a microphone for receiving voice input; and
   a speaker for outputting voice information, wherein the input/output level control device increases at least one of a sensitivity of the microphone and an output volume of the speaker, if the interrupt signal is received from the second external apparatus during a communication with the first external apparatus.

9. The communication apparatus of claim 8, further comprising:
   a reception device that receives an identifier of the second external apparatus, wherein the input/output level control device increases at least one of the sensitivity of the microphone and an output volume of the speaker after receiving the identifier of the second external apparatus.

10. The communication apparatus of claim 8, further comprising a returning device that returns at least one of the sensitivity of the microphone and the output volume of the speakers to a previous sensitivity or output volume, respectively.

11. The communication apparatus of claim 10, wherein the returning device returns at least one of the sensitivity of the microphone and the output volume of the speakers to a previous sensitivity or output volume, respectively, once a predetermined time has elapsed since the input/output level control device.

12. The communication apparatus of claim 2, wherein the display control device turns on the display when the interrupt signal from the first external apparatus is received during the communication with the second external apparatus and turns off the display when a predetermined time has elapsed from the time that the display was turned on or when a cancel command is received.

13. A memory medium that stores machine readable instructions for controlling a communication apparatus having a transmitter-receiver and a display, the memory medium comprising:
   instructions for gradually changing at least one of an input level of the transmitter-receiver and an output level of the transmitter-receiver to assist in detecting a caller identity of a second external apparatus, if an interrupt signal is received from the second external apparatus during a communication with a first external apparatus.

14. The memory medium of claim 13, further comprising:
instructions for displaying caller information corresponding to the second external apparatus on the display if the interrupt signal from the second external apparatus is received during the communication with the first external apparatus.

15. The memory medium of claim 13, further comprising:
instructions for switching from the communication with the first external apparatus to a communication with the second external apparatus on the basis of a predetermined switching operation signal.

16. The memory medium of claim 15, wherein the switching from the communication with the first external apparatus to the communication with the second external apparatus is performed after at least one of the input level and the output level of the transmitter-receiver is changed.

17. The memory medium of claim 13, further comprising instructions for changing back at least one of the input level and the output level to a previous input level or a previous output level, respectively, after at least one of the input level and the output level of the transmitter-receiver is changed.

18. The memory medium of claim 14, wherein the caller information includes at least one of a telephone number for the first external apparatus and a message expressed by characters.

19. The memory medium of claim 13, further comprising instructions for turning on the display when the interrupt signal from the second external apparatus is received during the communication with the first external apparatus and instructions for turning off the display when a predetermined time has elapsed from the time that the display was turned on or when a cancel command is received.

20. A method of controlling a communication device having a transmitter-receiver and a display, comprising:
receiving an interrupt signal from a second external apparatus while the communication device is communicating with a first external apparatus; and
gradually changing at least one of an input level of the transmitter-receiver and an output level of the transmitter-receiver to assist in detecting a caller identity of the second external apparatus, in response to receiving the interrupt signal.

21. The method of claim 20, further comprising:
displaying caller information corresponding to the second external apparatus on the display when the interrupt signal from the second external apparatus is received during the communication with the first external apparatus.

22. The method of claim 20, further comprising:
switching from the communication with the first external apparatus to a communication with the second external apparatus on the basis of a predetermined switching operation signal.

23. The method of claim 22, wherein the switching from the communication with the first external apparatus to the communication with the second external apparatus is performed after at least one of the input level and the output level of the transmitter-receiver is changed.

24. The method of claim 20, wherein after at least one of the input level and the output level of the transmitter-receiver is changed, the at least one of the input level and the output level is changed back to a previous input level or a previous output level, respectively, on the basis of a predetermined changing operation signal.

25. The method of claim 21, wherein the caller information includes at least one of a telephone number for the second external apparatus and a message expressed by characters.

26. The method of claim 20, wherein the transmitter-receiver further includes a microphone for receiving voice input and a speaker for outputting voice information and wherein changing at least one of an input level of the transmitter-receiver and an output level of the transmitter-receiver in response to receiving the interrupt signal further comprises increasing at least one of a sensitivity of the microphone and an output volume of the speaker.

27. The method of claim 20, wherein the display is turned on when the interrupt signal from the second external apparatus is received during the communication with the first external apparatus and the display is turned off when a predetermined time has elapsed from the time that the display was turned on or when a cancel command is received.

28. A communication apparatus comprising:
a microphone for inputting a voice of a user;
a reception device that receives an identity of a second external apparatus, if a communication arrives from the second external apparatus when the communication apparatus is in communication with a first external apparatus; and
a microphone sensitivity increasing device that gradually increases an input sensitivity of the microphone after the reception device receives the identifier of the second external apparatus.

29. The communication apparatus according to claim 28, further comprising a microphone sensitivity returning device that returns the input sensitivity of the microphone to a normal input sensitivity at a predetermined timing after the input sensitivity of the microphone is increased by the microphone sensitivity increasing device.

30. The communication apparatus according to claim 28, further comprising:
a speaker;
a detection device that detects a level of a sound inputted to the microphone; and
a speaker volume increasing device that increases a volume of the speaker if the detection device detects a decrease in the level of a sound inputted to the microphone while the input sensitivity of the microphone is increased by the microphone sensitivity increasing device.

31. The communication apparatus according to claim 30, further comprising a speaker volume returning device that returns the volume of the speaker to a previous volume at a predetermined timing after the volume of the speaker is increased by the speaker volume increasing device.

32. The communication apparatus according to claim 31, wherein the speaker volume returning device returns the volume of the speaker to the previous volume if the detection device detects an increase in the level of a sound inputted to the microphone.

33. The communication apparatus according to claim 28, further comprising a display, wherein the display is turned on when the identifier of the second external apparatus is received during the communication with the first external apparatus and is turned off when a predetermined time has elapsed from the time that the display was turned on or when a cancel command is received.

34. A communication apparatus, comprising:
a transmitter-receiver; and
an input/output level control device that initially increases at least one of an input level of the transmitter-receiver and an output level of the transmitter-receiver concerning a communication with a first external apparatus, if an interrupt signal is received from a second external apparatus during the communication with the first external apparatus to assist in detecting a caller identity of the second external apparatus.

35. The communication apparatus according to claim 34, wherein the input/output level control device gradually increases at least one of the input level of the transmitter-receiver and the output level of the transmitter-receiver.

36. A memory medium that stores machine readable instructions for controlling a communication apparatus having a transmitter-receiver and a display, the memory medium comprising:

instructions for initially increasing at least one of an input level of the transmitter-receiver and an output level of the transmitter-receiver concerning a communication with a first external apparatus, if an interrupt signal is received from a second external apparatus during the communication with the first external apparatus to assist in detecting a caller identity of the second external apparatus.

37. The memory medium according to claim 36, wherein the instructions gradually increase at least one of the input level of the transmitter-receiver and the output level of the transmitter-receiver.

38. A method of controlling a communication device having a transmitter-receiver and a display, comprising:

receiving an interrupt signal from a second external apparatus while the communication device is communicating with a first external apparatus; and initially increasing at least one of an input level of the transmitter-receiver and an output level of the transmitter-receiver to assist in detecting a caller identity of the second external apparatus, concerning communication with the first external apparatus, in response to receiving the interrupt signal.

39. The method according to claim 38, wherein the increasing step gradually increases at least one of the input level of the transmitter-receiver and the output level of the transmitter-receiver.

40. A communication apparatus comprising:

a microphone for inputting a voice of a user;

a reception device that receives an identity of a second external apparatus, if a communication arrives from the second external apparatus when the communication apparatus is in communication with a first external apparatus; and a microphone sensitivity increasing device that initially increases an input sensitivity of the microphone concerning the communication with the first external apparatus after the reception device receives the identifier of the second external apparatus.

41. The communication apparatus according to claim 40, wherein the microphone sensitivity increasing device gradually increases the input sensitivity of the microphone.

42. A communication terminal capable of receiving an interrupt signal and an identifier from a second external apparatus while the communication terminal is in communication with a first external apparatus, comprising:

a casing;

a microphone that inputs a voice of a user, the microphone being provided in the casing;

a speaker that outputs at least a voice sound received from an external apparatus, the speaker being provided in the casing;

a display that displays the identifier received from an external apparatus, the display being provided in the casing; and an input/output level control device that initially increases at least one of an input sensitivity of the microphone and an output level of the speaker, if the interrupt signal is received from the second external apparatus during the communication with the first external apparatus.

43. The communication terminal according to claim 42, wherein the input/output level control device gradually increases at least one of the input sensitivity of the microphone and the output level of the speaker.

* * * * *